(12) United States Patent
Takizawa et al.

(10) Patent No.: US 6,713,928 B2
(45) Date of Patent: Mar. 30, 2004

(54) AUTOMOTIVE ALTERNATOR

(75) Inventors: Takushi Takizawa, Tokyo (JP); Atsushi Oohashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/993,688

(22) Filed: Nov. 27, 2001

(65) Prior Publication Data

US 2002/0175589 A1 Nov. 28, 2002

(30) Foreign Application Priority Data

May 28, 2001 (JP) .......................... 2001-158853

(51) Int. Cl.[7] .......................... H02K 3/487; H02K 19/00
(52) U.S. Cl. .......................... 310/214; 310/179; 310/180; 310/184
(58) Field of Search .............................. 310/179, 180, 310/184, 214

(56) References Cited

U.S. PATENT DOCUMENTS

| 3,991,152 A | | 11/1976 | Santi et al. | |
| 5,359,249 A | * | 10/1994 | Tanaka | 310/216 |
| 5,576,584 A | * | 11/1996 | Kusumoto et al. | 310/45 |
| 6,057,624 A | * | 5/2000 | Ohtake et al. | 310/214 |
| 6,181,045 B1 | * | 1/2001 | Umeda et al. | 310/201 |
| 6,281,612 B1 | * | 8/2001 | Asao et al. | 310/179 |
| 6,455,971 B1 | * | 9/2002 | Palma et al. | 310/180 |
| 6,504,283 B1 | * | 1/2003 | Asao et al. | 310/254 |
| 2002/0079772 A1 | | 6/2002 | Oohashi et al. | |

FOREIGN PATENT DOCUMENTS

| DE | 19950418 A1 | | 4/2001 | |
| EP | 999637 | * | 5/2000 | H02K/3/487 |
| JP | 59-191856 | | 12/1984 | |
| JP | 60-114558 | | 8/1985 | |
| JP | 4-26345 | * | 1/1992 | H02K/19/22 |
| JP | 2000-014068 | | 1/2000 | |

OTHER PUBLICATIONS

Patent Abstract of Japan Patent 07231591; Mitsubishi Electric Corporation, Aug. 29, 1995.

* cited by examiner

*Primary Examiner*—Burton Mullins
(74) *Attorney, Agent, or Firm*—Sughrue Mion, PLLC (57) ABSTRACT

An automotive alternator includes a rotor fixed to a shaft rotatably supported in a case, and a stator provided with a cylindrical stator core supported in the case so as to envelop the rotor, slots extending axially being formed in the stator core so as to line up in a circumferential direction at a ratio of two per phase per pole, and a stator winding constructed by installing a conductor wire coated with an electrical insulator in the stator core, a relationship between a radial dimension (d) of the conductor wire coated with the electrical insulator and a circumferential width dimension (L) of the slots being 2d<L.

10 Claims, 10 Drawing Sheets

AUTOMOTIVE ALTERNATOR

BACKGROUND OF THE INVENTION

1. Field of the Invention

The present invention relates to an automotive alternator mounted with a stator having a stator core in which slots are formed at a ratio of two per phase per pole.

2. Description of the Related Art

Generally, an automotive alternator includes: a stator composed of a stator winding installed in a cylindrical stator core in which slots extending axially are formed at an even angular pitch in a circumferential direction; and a rotor having a field winding disposed on an inner circumferential side of the stator. The slots are disposed in the stator core at a ratio of one per phase per pole, in proportion to the number of phases in the stator winding and the number of magnetic poles in the rotor.

When the slots are disposed at a ratio of one per phase per pole in this manner, the amount of time that any given tooth formed between the slots overlaps an adjacent pair of the magnetic poles relative to a radial direction is long, leading to increased magnetic flux leakage. This magnetic flux leakage reduces effective magnetic flux and gives rise to surges in the magnetic flux, resulting in fluctuations in the generated voltage and disturbing the output waveform, which causes ripples when the alternating current is converted into direct current.

Thus, an attempt has been proposed in Japanese Patent Laid-Open No. HEI 4-26345, for example, to reduce magnetic flux leakage by disposing the slots at a ratio of two per phase per pole to shorten the amount of time that any given tooth overlaps an adjacent pair of the magnetic poles.

Figure 9:
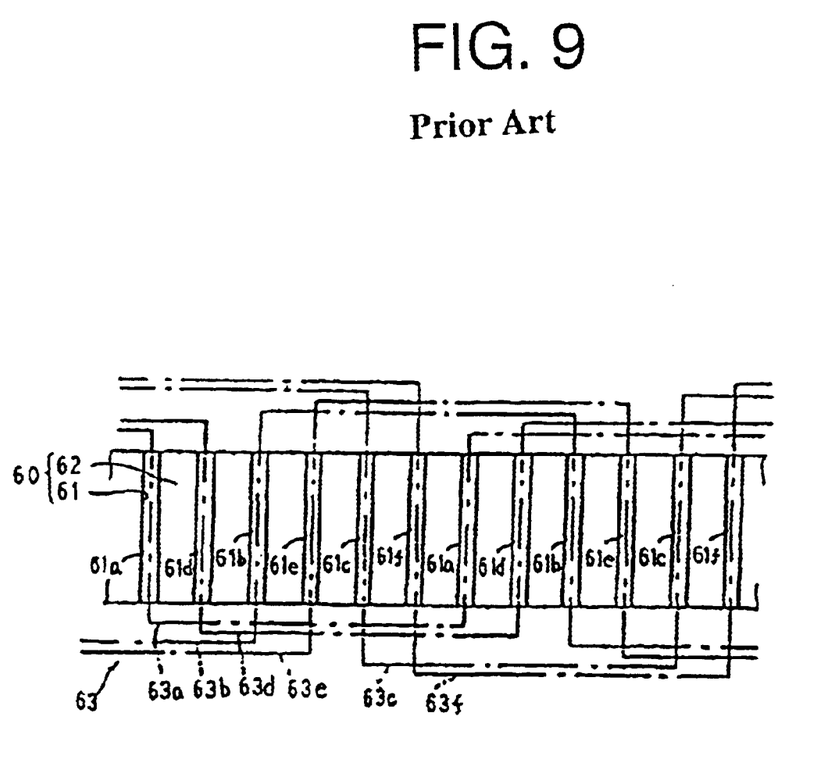
FIG. 9 is a schematic diagram in which a part of a first stator for a conventional automotive alternator is developed into a plan.

FIG. 9 is a schematic diagram in which part of a first stator such as that described in Japanese Patent Laid-Open No. HEI 4-26345, for example, is developed into a plan.

In FIG. 9, a stator core 60 is composed of a magnetic steel plate formed into a cylindrical shape, slots 61 extending axially being disposed therein at an even angular pitch in a circumferential direction at a ratio of two per phase per pole. Here, for twelve magnetic poles in a rotor (not shown), seventy-two slots 61 are disposed in the stator core 60 so as to obtain a stator winding 63 composed of first and second three-phase alternating-current windings. The seventy-two slots 61 are disposed at a pitch corresponding to an electrical angle of 30° from each other, being arranged in order of an a-phase slot 61a, a d-phase slot 61d, a b-phase slot 61b, an e-phase slot 61e, a c-phase slot 61c, and an f-phase slots 61f repeatedly in a circumferential direction.

An a-phase winding phase portion 63a is constructed by winding conductor wires into a wave shape in the a-phase slot group 61a, a b-phase winding phase portion 63b is constructed by winding conductor wires into a wave shape in the b-phase slot group 61b, and a c-phase winding phase portion 63c is constructed by winding conductor wires into a wave shape in the c-phase slot group 61c. The first three-phase alternating-current winding is constructed by forming the a-phase, b-phase, and c-phase winding phase portions 63a, 63b, and 63c wound in this manner into a Y-connection (an alternating-current connection). Here, the a-phase, b-phase, and c-phase slots 61a, 61b, and 61c into which the a-phase, b-phase, and c-phase winding phase portions 63a, 63b, and 63c are inserted have a phase difference corresponding to an electrical angle of 120° from each other.

A d-phase winding phase portion 63d is constructed by winding conductor wires into a wave shape in the d-phase slot group 61d, an e-phase winding phase portion 63e is constructed by winding conductor wires into a wave shape in the e-phase slot group 61e, and an f-phase winding phase portion 63f is constructed by winding conductor wires into a wave shape in the f-phase slot group 61f. The second three-phase alternating-current winding is constructed by forming the d-phase, e-phase, and f-phase winding phase portions 63d, 63e, and 63f wound in this manner into a Y-connection. Here, the d-phase, e-phase, and f-phase winding phase portions 63d, 63e, and 63f have a phase difference corresponding to an electrical angle of 120° from each other. Furthermore. the d-phase, e-phase, and f-phase winding phase portions 63d, 63e, and 63f have a phase difference corresponding to an electrical angle of 30° from the a-phase, b-phase, and c-phase winding phase portions 63a, 63b, and 63c, respectively.

A stator is prepared by installing these six winding phase portions 63a, 63b, 63c, 63d, 63e, and 63f in the stator core 60. In an automotive alternator constructed in this manner, alternating-current outputs from the first and second three-phase alternating-current windings are each rectified by separate rectifiers, and then the rectified outputs are combined.

Thus, because the slots 61 are disposed at a ratio of two per phase per pole, portions of a tooth 62 overlapping an adjacent pair of the magnetic poles relative to the radial direction are dramatically reduced. Hence, magnetic flux leakage is reduced, enabling reductions in effective magnetic flux to be suppressed. Similarly, the generation of surges in the magnetic flux is suppressed, reducing fluctuations in the generated voltage and disturbances to the output waveform, thereby reducing ripples when the alternating current is converted into direct current.

Figure 10:
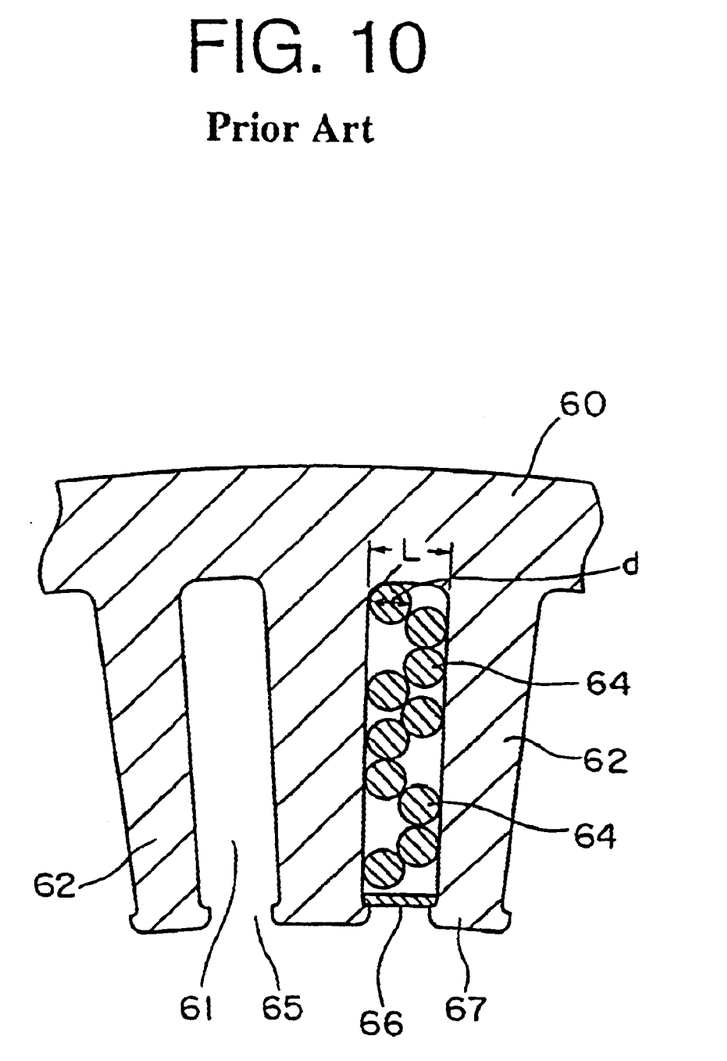
FIG. 10 is a partial cross section of the first stator of the conventional automotive alternator.

In automotive alternators of the above construction, because the slots 61 of the stator are formed at a ratio of two per phase per pole, the number of slots 61 is greater than when the slots are formed at a ratio of one per phase per pole, giving rise to the following problems:

a) As shown in FIG. 10, a circumferential dimension (L) of the slots 61 is small, becoming 2d>L in relation to a radial dimension (d) of conductor wires 64, resulting in the conductor wires 64 being housed in the slots 61 at random, thereby making the space factor of the conductor wires 64 in the slots 61 low and the ratio occupied by a space portion high, and since there are also few contacting portions between the teeth 62 and the conductor wires 64 or contacting portions among the conductor wires 64, heat transfer from the conductor wires 64 to the stator core 60 or from one conductor wire 64 to another is low, making temperature increases in the stator winding 63 high, thereby leading to declines in output and declines in heat durability;

b) Because width dimensions of the teeth 62 are reduced, reducing the rigidity of the teeth 62, electromagnetic noise generated by the teeth 62 due to circumferential vibrations is increased;

c) Because circumferential dimensions of the opening portions 65 of the slots 61 are small, the frequency with which the conductor wires 64 come into contact with flange portions 67 of tip portions of the teeth 62 when the conductor wires 64 are installed from radially inside toward the outside increases, making electrical insulation of the conductor wires 64, which are coated with an electrical insulator, poor; and d) Because gaps arise easily between wedges 66 and the conductor wires 64 on the radially innermost side, and because circumferential projection portions on the flange portions 67 for hooking the wedges 66 are small, there is a risk that the wedges 66 will oscillate and dislodge from the opening portions 65.

SUMMARY OF THE INVENTION

The present invention aims to solve the above problems and an object of the present invention is to provide an automotive alternator capable of reducing the magnitude of temperature increases and electromagnetic noise in a stator.

In order to achieve the above object, according to one aspect of the present invention, there is provided an automotive alternator including:

a rotor fixed to a shaft rotatably supported in a case; and a stator provided with:

a cylindrical stator core supported in the case so as to envelop the rotor, slots extending axially being formed in the stator core so as to line up in a circumferential direction at a ratio of two per phase per pole; and a stator winding constructed by installing a conductor wire coated with an electrical insulator in the stator core, a relationship between a radial dimension (d) of the conductor wire coated with the electrical insulator and a circumferential width dimension (L) of the slots being 2d<L.

A cross section of the slots taken along a radial direction may have a rectangular shape.

A width dimension (s) of an opening portion of the slots may be 1.5 or more times a radial dimension (d) of the conductor wire.

An inner circumferential corner portion of a radially-wide flange portion on a tip portion of a tooth between the slots may have a curved shape.

An electrically-insulating resin layer may be formed on an inner wall surface of the slots.

First and second three-phase alternating-current windings may be constructed by installing a plurality of the conductor wires in the slots, a predetermined number of the conductor wires being bundled together.

A deforming cylindrical plug may be disposed inside an opening portion of the slots.

A deforming hollow cylindrical plug may be disposed inside an opening portion of the slots.

A deformable plug may be disposed inside an opening portion of the slots.

A cut portion may be formed in the plug.

Shapes of first and second circumferential end portions of the flange portion may be asymmetrical.

A varnish portion may be disposed on an inner circumferential side of the plug.

DETAILED DESCRIPTION OF THE PREFERRED EMBODIMENTS

The preferred embodiments of the present invention will now be explained with reference to the drawings.

Embodiment 1

Figure 1:
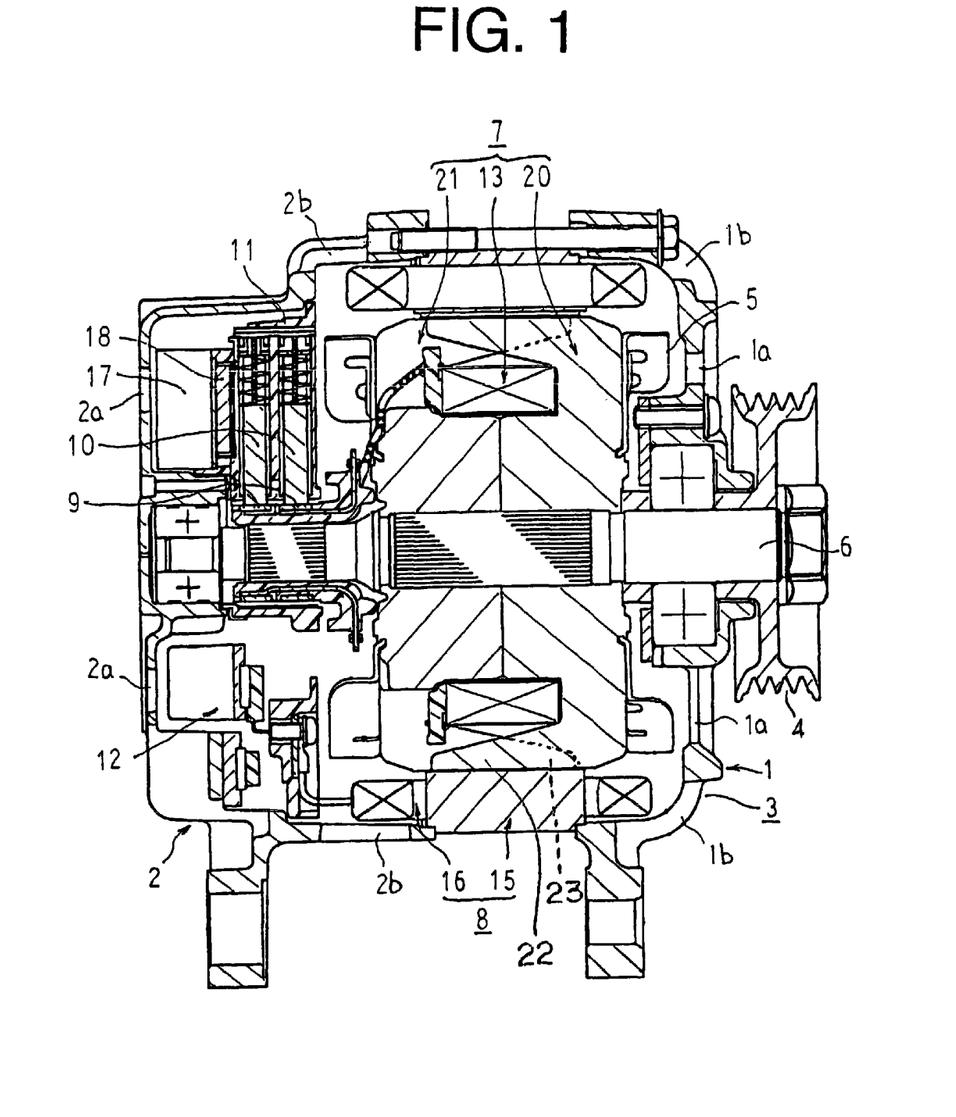
FIG. 1 is a cross section showing an automotive alternator according to Embodiment 1 of the present invention.
Figure 2:
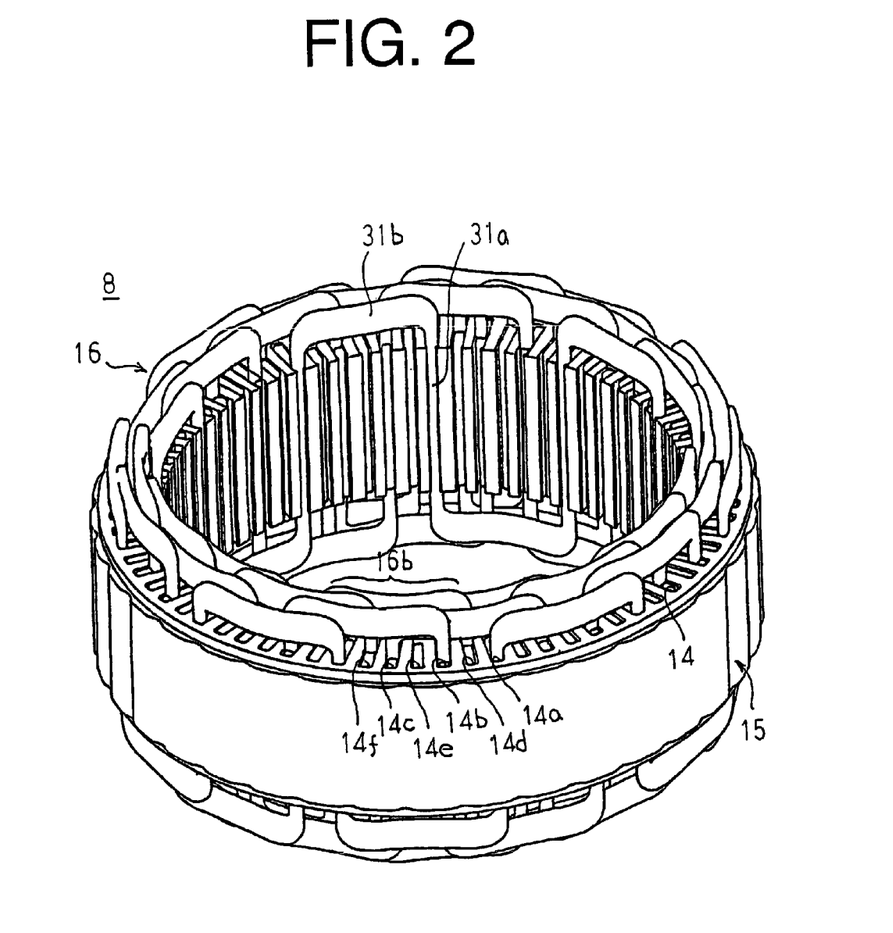
FIG. 2 is a perspective showing a stator of the automotive alternator according to Embodiment 1 of the present invention. (Plugs have been omitted from the drawing.)
Figure 3:
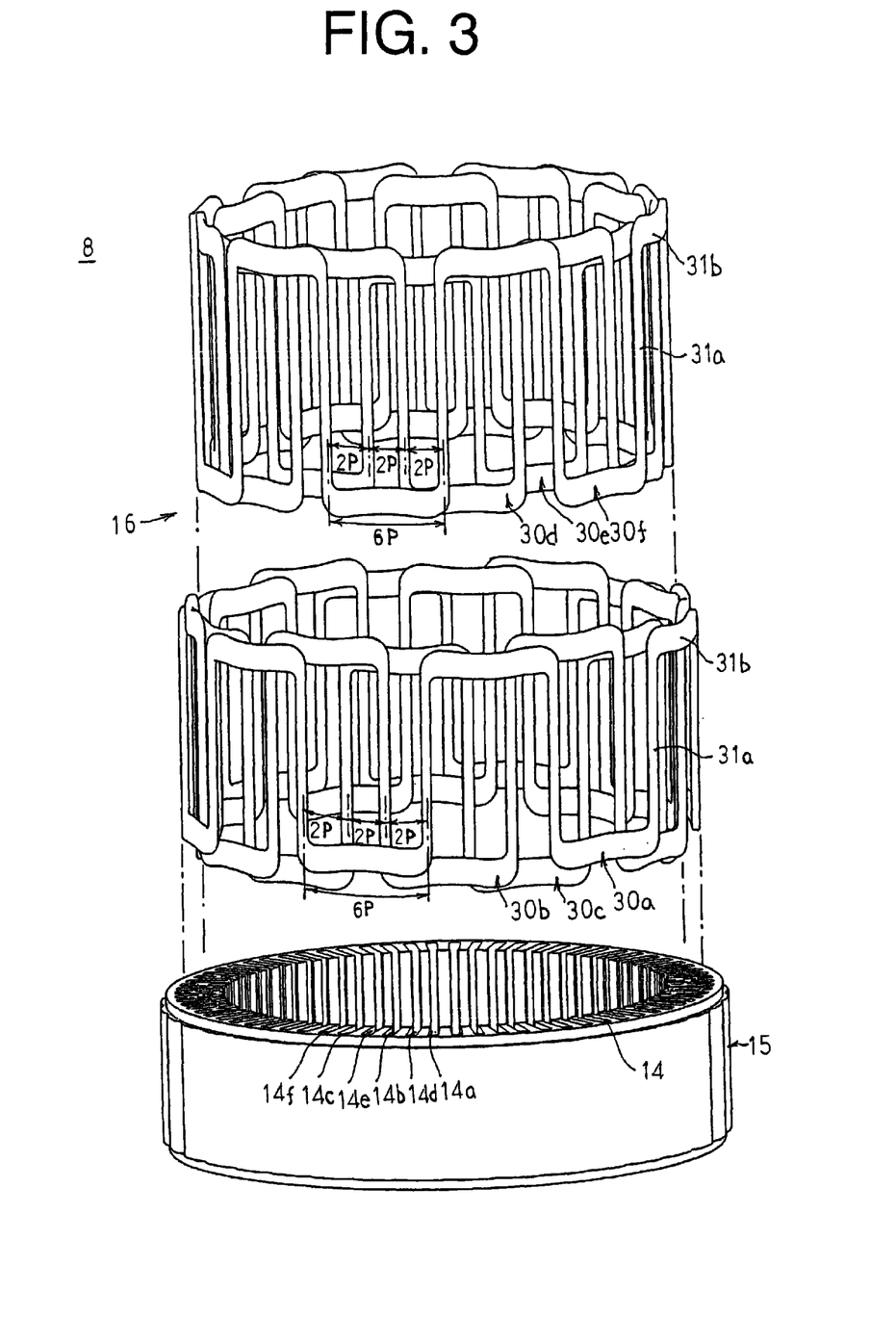
FIG. 3 is an exploded perspective showing the stator of the automotive alternator according to Embodiment 1 of the present invention.
Figure 4:
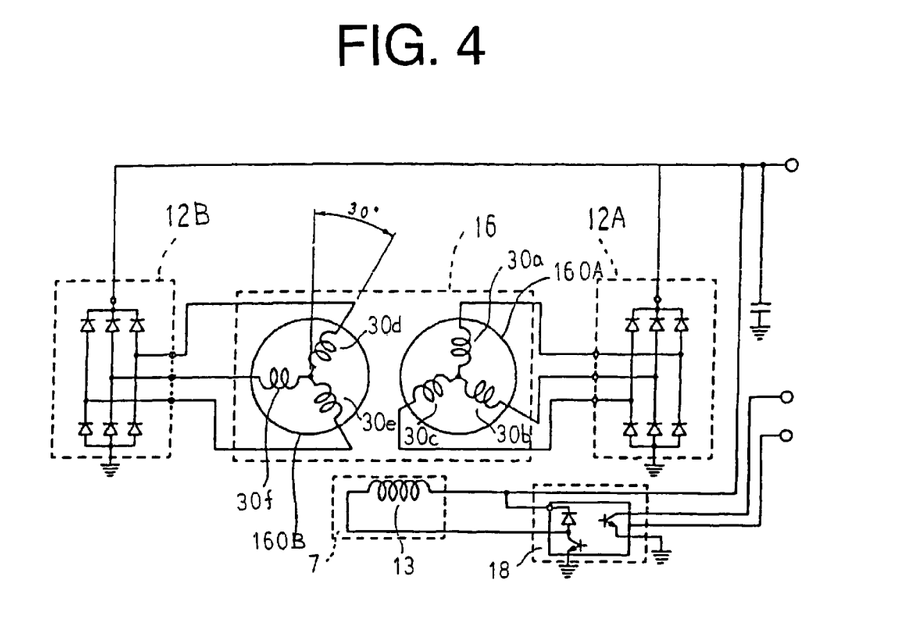
FIG. 4 is a circuit diagram showing an electrical circuit in the automotive alternator according to Embodiment 1 of the present invention.

FIG. 1 is a cross section showing an automotive alternator according to Embodiment 1 of the present invention, FIG. 2 is a perspective showing a stator of the automotive alternator according to Embodiment 1 of the present invention, FIG. 3 is an exploded perspective showing the stator of the automotive alternator according to Embodiment 1 of the present invention, and FIG. 4 is a circuit diagram showing an electrical circuit in the automotive alternator according to Embodiment 1 of the present invention.

In FIG. 1, the automotive alternator includes: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; cooling fans 5 secured to first and second axial end portions of the rotor 7; a stator 8 secured to the case 3 so as to envelop the rotor 7; slip rings 9 secured to a second end portion of the shaft 6 for supplying electric current to the rotor 7; a pair of brushes 10 sliding on surfaces of the slip rings 9; a brush holder 11 accommodating the brushes 10; rectifiers 12 constituted by first and second rectifiers 12A and 12B electrically connected to the stator 8 to convert alternating current generated in the stator 8 into direct current; and a regulator 18 mounted to a heat sink 17 fitted onto the brush holder 11, the regulator 18 adjusting the magnitude of the alternating voltage generated in the stator 8.

The rotor 7 includes: a field winding 13 for generating magnetic flux on passage of an electric current; and a pair of first and second pole cores 20 and 21 disposed so as to cover the field winding 13, magnetic poles being formed in the first and second pole cores 20 and 21 by magnetic flux therefrom. The first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15 formed by laminating a magnetic steel plate; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

Next, a construction of the stator 8 will be explained with reference to FIGS. 2 to 3.

Slots 14 extending axially are disposed in the stator core 15 at an even angular pitch (a pitch corresponding to an electrical angle of 30°) in a circumferential direction at a ratio of two per phase per pole. In other words, for twelve claw-shaped magnetic poles 22 and 23 in the rotor 7, seventy-two slots 14 are disposed in the stator core 15 to obtain the stator winding 16, which is composed of first and second three-phase alternating-current windings 160A and 160B. Here, the slots 14 are arranged in order of an a-phase slot 14a, a d-phase slot 14d, a b-phase slot 14b, an e-phase slot 14e, a c-phase slot 14c, and an f-phase slot 14f repeatedly in a circumferential direction. Moreover, the slots 14 in each phase are disposed at a pitch of six slots.

As shown in FIG. 3, an a-phase winding phase portion 30a is constructed by winding a conductor wire composed of a continuous copper wire coated with an electrical insulator for a predetermined number of winds into a wave-shaped pattern composed of twelve slot-housed portions 31a disposed at a pitch of six slots (6P) in a circumferential direction and linking portions 31b linking together end portions of adjacent pairs of the slot-housed portions 31a alternately at first and second axial ends. The a-phase winding phase portion 30a is installed in the stator core 15 such that the slot-housed portions 31a are housed in the respective a-phase slots 14a disposed at the pitch of six slots. The linking portions 31b linking together the end portions of the adjacent pairs of the slot-housed portions 31a extend circumferentially axially outside the stator core 15, constituting coil ends. Furthermore, b-phase, c-phase, d-phase, e-phase, and f-phase winding phase portions 30b, 30c, 30d, 30e, and 30f are constructed in a similar manner.

The a-phase, b-phase, and c-phase winding phase portions 30a, 30b, and 30c are installed in the stator core 15 so as to be circumferentially offset from each other by a pitch of two slots (2P) and stacked in three layers radially. Similarly, the f-phase, d-phase, and e-phase winding phase portions 30f, 30d, and 30e are installed in the stator core 15 so as to be circumferentially offset from each other by a pitch of two slots, to be stacked in three layers radially, and to be positioned on an inner circumferential side of the a-phase, b-phase, and c-phase winding phase portions 30a, 30b, and 30c.

Hence, as shown in FIG. 2, the stator 8 is obtained, in which the six winding phase portions 30a to 30f are installed in the stator core 15 so as to be stacked in six layers radially. Here, the six winding phase portions 30a to 30f are installed in the stator core 15 so as to line up from an outer circumferential side in order of the a-phase winding phase portion 30a, the b-phase winding phase portion 30b, the c-phase winding phase portion 30c, the f-phase winding phase portion 30f, the d-phase winding phase portion 30d, and the e-phase winding phase portion 30e. The coil ends (the linking portions 31b) of the six winding phase portions 30a to 30f constitute front-end and rear-end coil end groups 16f and 16r of the stator winding 16. Moreover, a varnish is impregnated into the coil end groups 16f and 16r.

The a-phase, b-phase, and c-phase winding phase portions 30a, 30b, and 30c constructed in this manner are formed into a Y-connection (an alternating-current connection), constituting the first three-phase alternating-current winding 160A, and the d-phase, e-phase, and f-phase winding phase portions 30d, 30e, and 30f are formed into a Y-connection (an alternating-current connection), constituting the second three-phase alternating-current winding 160B. The first and second three-phase alternating-current windings 160A and 160B are connected to the first and second rectifiers 12A and 12B, respectively, constituting the electrical circuit shown in FIG. 4.

Moreover, the a-phase, b-phase, and c-phase winding phase portions 30a, 30b, and 30c are each given a phase difference corresponding to an electrical angle of 120°, and the d-phase, e-phase, and f-phase winding phase portions 30d, 30e, and 30f are each given a phase difference corresponding to an electrical angle of 120°. In addition, the d-phase, e-phase, and f-phase winding phase portions 30d, 30e, and 30f are given a phase difference corresponding to an electrical angle of 30° relative to the a-phase, b-phase, and c-phase winding phase portions 30a, 30b, and 30c, respectively.

In an automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the three-phase alternating-current windings 160A and 160B of the stator winding 16. The alternating electromotive force generated in each of the three-phase alternating-current windings 160A and 160B is converted into direct current by the first and second rectifiers 12A and 12B, respectively, and the magnitudes of the voltages output therefrom are adjusted by the regulator 18. Then, the output from each of the rectifiers 12 is combined, recharging the battery.

Figure 5:
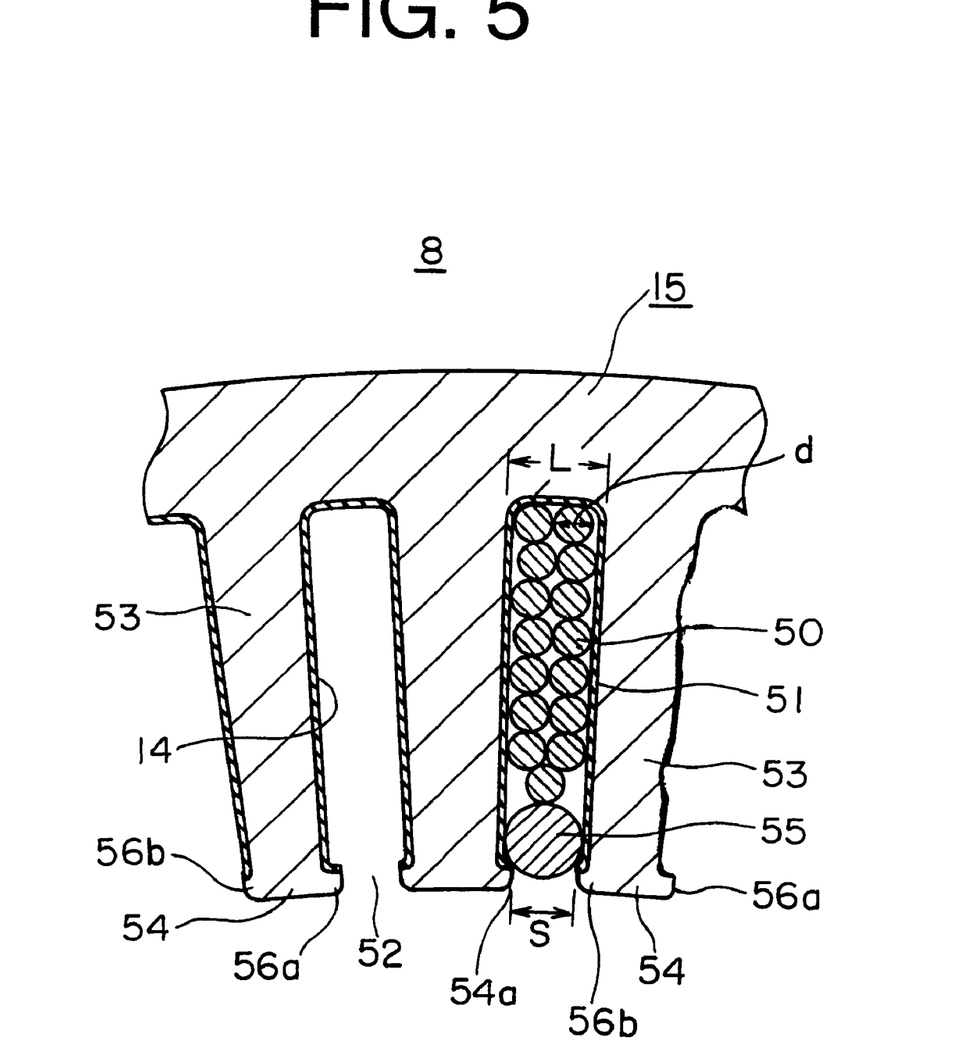
FIG. 5 is a partial cross section of the stator of the automotive alternator according to Embodiment 1 of the present invention.

FIG. 5 is a diagram showing the manner in which fifteen conductor wires 50 coated with an electrical insulator are housed in each of the slots 14 of the stator core 15 in FIG. 1.

The shape of the slots 14 in a cross section taken along a radial direction is rectangular, and an electrically-insulating resin layer 51 constituted by an epoxy resin is formed on inner wall surfaces of the slots 14. The relationship between a radial dimension (d) of the conductor wires 50 coated with the electrical insulator and a circumferential width dimension (L) of the slots 14 is 2d<L. A width dimension (s) of opening portions 52 of the slots 14 is 1.5 or more times the radial dimension (d) of the conductor wires 50.

Inner circumferential corner portions 54a of radially-wide flange portions 54 on tip portions of teeth 53 between the slots 14 have a curved shape. The shapes of first and second circumferential end portions of the flange portions 54 are asymmetrical, first retaining portions 56a which are the first circumferential end portions of the flange portions 54 projecting more than second retaining portions 56b which are the second circumferential end portions.

An elastically-deforming cylindrical plug 55 is disposed inside the opening portion 52 of each of the slots 14.

In this embodiment, compared to the conventional example, the circumferential dimensions of the slots 14 are such that two conductor wires 50 are housed in that direction, enabling the conductor wires 50 to be arranged substantially in two rows in a radial direction in the slots 14, thereby increasing the space factor of the conductor wires 50 in each of the slots 14, and contacting portions between the teeth 53 and the conductor wires 50 and the contact surface area among the conductor wires 50 are increased, promoting heat transfer from the conductor wires 50 to the stator core 15 or from one conductor wire 50 to another, thereby reducing temperature increases in the stator winding 16. When an actual experiment was performed under predetermined conditions, the value of temperature increase in the stator was 170 degrees Celsius compared to 180 degrees Celsius in the conventional example, confirming that temperature increases are reduced.

Although the width dimensions of the teeth 53 are reduced, reducing the rigidity of the teeth 53, the contact surface area between circumferential side surfaces of the teeth 53 and the conductor wires 50 is increased and the teeth 53 are supported more securely from both circumferential sides, reducing the sound pressure level of electromagnetic noise generated by the teeth 53 vibrating circumferentially. When an actual experiment was performed under conditions in which the rotational frequency of the rotor 7 was 5000 rpm, electromagnetic noise was 72 dB, a reduction of 3 dB from 75 dB in the conventional example.

Because the width dimension (s) of the opening portions 52 of the slots 14 is 1.5 or more times the radial dimension (d) of the conductor wires 50, the frequency with which the conductor wires 50 come into contact with the flange portions 54 on the tip portions of the teeth 53 when the conductor wires 50 are installed from radially inside toward the outside is low, improving electrical insulation of the conductor wires 50 coated with the electrical insulator. Because the corner portions 54a of the flange portions 54 have a curved shape, the electrically-insulating coating on the conductor wires 50 is less likely to be damaged even if the conductor wires 50 strike the corner portions 54a when the conductor wires 50 are installed.

Because the electrically-insulating resin layer 51 constituted by the epoxy resin is formed on the inner wall surfaces of each of the slots 14, in the stator core 15 constructed by laminating the steel plate, bonding strength between the layers of the steel plate is improved, raising the rigidity of the stator core 15, reducing electromagnetic noise proportionately. Moreover, when the electrically-insulating resin layer 51 is constituted by a resin having a high coefficient of thermal conductivity, heat transfer from the conductor wires 50 to the stator core 15 is promoted, further reducing temperature increases in the stator winding 16.

Because the cylindrical plugs 55 are disposed inside the opening portions of the slots 14, and the conductor wires 50 on the radially innermost side and the elastically-deforming plugs 55 are in contact with each other, the conductor wires 50 are less likely to move around inside the slots 14, reducing the likelihood that the electrically-insulating coating will be damaged by friction between the conductor wires 50.

Because the first retaining portions 56a on the flange portions 54 project more than the second retaining portions 56b, the plugs 55 can be mounted to the opening portions 52 of the slots 14 smoothly if the plugs 55 are first engaged in the first retaining portions 56a then engaged in the second retaining portions 56b which do not project as far as the first retaining portions 56a. The plugs 55 are engaged by the first retaining portions 56a and the second retaining portions 56b, reducing the likelihood that the conductor wires 50 and the plugs 55 will come out of the slots 14.

In the above embodiment, fifteen conductor wires 50 are housed inside the slots 14, but by installing bundles of three conductor wires 50 in five parallel turns, winding manufacturing time can be shortened compared to when each of the conductor wires is installed individually.

Embodiment 2

Figure 6:
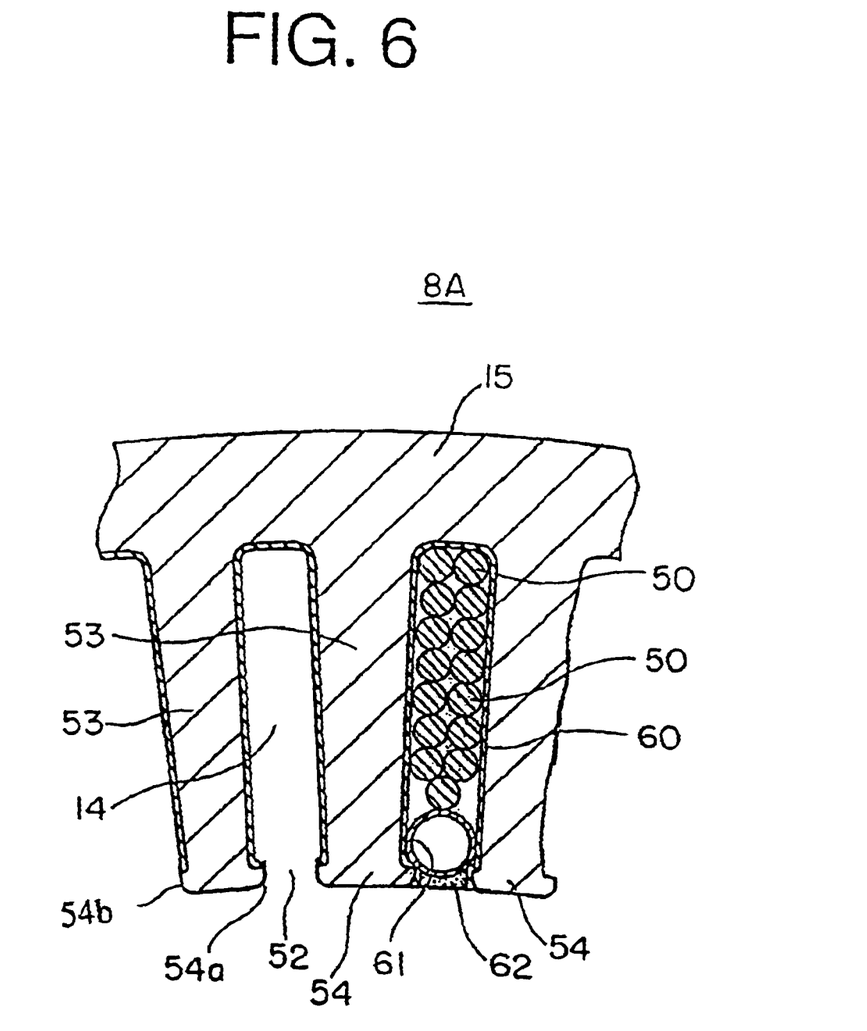
FIG. 6 is a partial cross section of the stator of the automotive alternator according to Embodiment 2 of the present invention.

FIG. 6 is a partial cross section of the stator 8A of the automotive alternator according to Embodiment 2. This embodiment differs from Embodiment 1 in the fact that an insulating paper 60 is disposed on the inner wall surfaces of each of the slots 14, the fact that elastically-deforming hollow cylindrical plugs 61 are provided, and the fact that a varnish portion 62 is disposed in each of the opening portions 52 so as to impregnate end portions of the insulating paper 60.

In this embodiment, cooling of the stator winding 16 constituted by the conductor wires 50 is made possible by the passage of cooling air through the inside of the plugs 61, reducing temperature increases in the stator 8A.

The plugs 61 and the flange portions 54 are integrated by the varnish portions 62, reducing circumferential vibrations in the teeth 53, thereby reducing electromagnetic noise.

Embodiment 3

Figure 7:
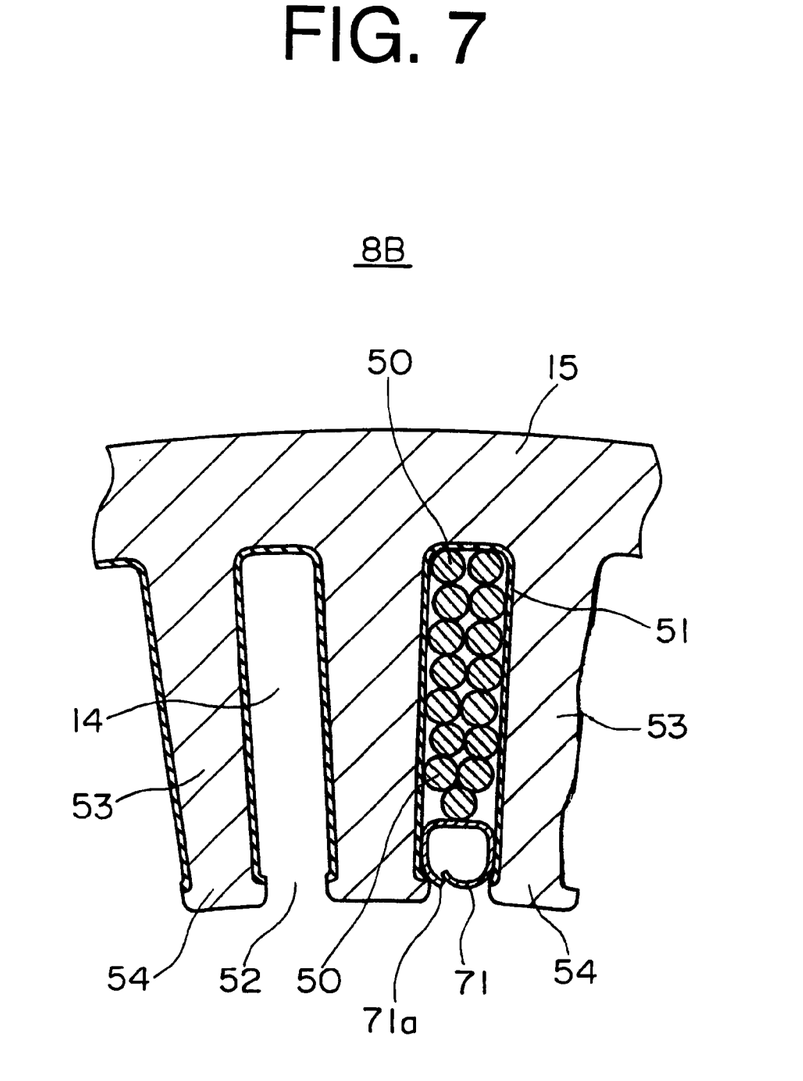
FIG. 7 is a partial cross section of the stator of the automotive alternator according to Embodiment 3 of the present invention.

FIG. 7 is a partial cross section of the stator 8B according to Embodiment 3. Embodiment 3 differs from Embodiment 1 in the fact that deformable plugs 71 having cut portions 71a are disposed inside the opening portions 52 of the slots 14.

In this embodiment, the plugs 71 deform to fill space portions between the opening portions 52 of the slots 14 and the conductor wires 50, improving adhesion between the conductor wires 50 and the plugs 71 and reducing vibration of the conductor wires 50, thereby reducing electromagnetic noise.

Figure 8:
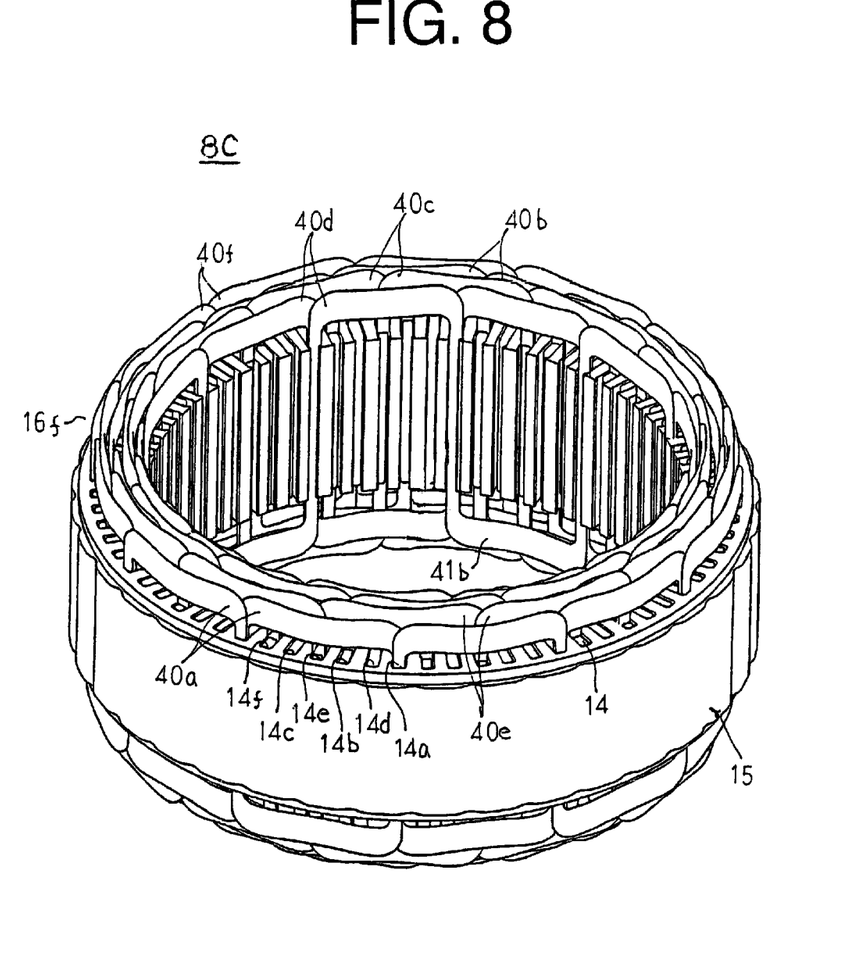
FIG. 8 is a perspective showing a second stator for a conventional automotive alternator.

Moreover, in each of the above embodiments, the linking portions 31b of each of the winding phase portions 30a to 30f extending outward from the slots 14 extend outward to one circumferential side, but the present invention can also be applied to a second conventional stator 8C provided with a stator winding 16A having a distributed construction in which the linking portions 41b of each of the winding phase portions 40a to 40f extending outward from the slots 14 are distributed half each to first and second circumferential sides, as shown in FIG. 8.

The plugs used in each of the above embodiments are composed of an elastically-deforming material, but plastically-deforming plugs may also be used. In that case, since the plugs deform to match the shape of the end of the slots, the degree of adhesion between the teeth and the plugs, and between the conductor wires and the plugs increases, enabling the plugs to be fixed inside the opening portions of the slots more securely.

In each of the above embodiments, the winding phase portions are constructed using conductor wires having a circular cross section, but the conductor wires inserted inside the slots may also have a rectangular cross section. In that case, since the surface area over which the conductor wires in the slots come into contact with the slot wall surfaces increases, each of the effects explained in each of the above embodiments (improvements in the space factor of the conductor wires, reductions in temperature increases due to the promotion of heat transfer, etc.) is increased. In other words, space produced by laminating conductor wires having a circular cross section can be eliminated by using conductor wires having a rectangular cross section, enabling the winding phase portions to be constructed without forming waste space at corner portions of the conductor wires.

In each of the above embodiments, a five-turn parallel winding is constructed by simultaneously wave winding and installing three conductor wires, but the present invention is not limited to this provided that the expression 2d<L is satisfied; naturally, similar effects can also be achieved if two, or four or more, conductor wires are simultaneously installed.

As explained above, according to one aspect of the present invention, a relationship between a radial dimension (d) of the conductor wire coated with the electrical insulator and a circumferential width dimension (L) of the slots is 2d<L, increasing the contact surface area between the teeth between the slots and the conductor wires and the contact surface area among the conductor wires, thereby promoting heat transfer and reducing temperature increases in the stator. Furthermore, the teeth are more reliably supported by the conductor wires on first and second sides, suppressing vibration of the teeth, thereby reducing electromagnetic noise.

A cross section of the slots taken along a radial direction may have a rectangular shape, making the number of the conductor wires in each layer in the slots the same, whereby the conductor wires are arranged in rows in the slots, further reducing temperature increases in the stator, and vibration of the teeth is further suppressed, further reducing electromagnetic noise.

A width dimension (s) of an opening portion of the slots may be 1.5 or more times a radial dimension (d) of the conductor wire, whereby the conductor wires are installed inside the slots smoothly, making it less likely that the electrically-insulating coating of the conductor wires will be damaged during installation, thereby improving electrical insulation of the conductor wires.

An inner circumferential corner portion of a radially-wide flange portion on a tip portion of a tooth between the slots may have a curved shape, making it less likely that the electrically-insulating coating of the conductor wires will be damaged during installation even if the conductor wires collide with the flange portion on the tooth, thereby improving electrical insulation of the conductor wires.

An electrically-insulating resin layer may be formed on an inner wall surface of the slots, increasing the rigidity of the teeth, thereby reducing electromagnetic noise. Furthermore, if the electrically-insulating resin layer is constituted by a resin having a high coefficient of thermal conductivity, heat from the conductor wires is more easily transferred to the stator core, reducing temperature increases in the stator winding.

First and second three-phase alternating-current windings may be constructed by installing a plurality of the conductor wires in the slots, a predetermined number of the conductor wires being bundled together, shortening the winding manufacturing process.

A deforming cylindrical plug may be disposed inside an opening portion of the slots, whereby the plug adheres to the opening portion, preventing the conductor wires and the plug from coming out or dislodging. Furthermore, circumferential vibration of the tip portions of the teeth is also suppressed, reducing electromagnetic noise.

A deforming hollow cylindrical plug may be disposed inside an opening portion of the slots, enabling cooling of the conductor wires by cooling air passing through the inside of the plug, reducing temperature increases in the stator winding.

A deformable plug may be disposed inside an opening portion of the slots, whereby the plug deforms and fills a space portion between the opening portions of the slots and the conductor wires, improving adhesion between the conductor wires and the plug and reducing vibration of the conductor wires, thereby reducing electromagnetic noise.

A cut portion may be formed in the plug, further facilitating deformation of the plug, thereby further improving adhesion between the conductor wires and the plug.

Shapes of first and second circumferential end portions of the flange portion may be asymmetrical, whereby the plug can be inserted smoothly into the opening portion of the slot by inserting the side of the plug near the end portion of the flange portion with the smaller projection later when the plug is inserted inside the slot from a radial direction.

A varnish portion may be disposed on an inner circumferential side of the plug, whereby the plug and the flange portions are integrated by the varnish portion increasing rigidity of the stator and reducing circumferential vibration of the teeth, thereby reducing electromagnetic noise.

What is claimed is:

1. An automotive alternator comprising:
   a rotor fixed to a shaft rotatably supported in a case; and
   a stator provided with:
      a cylindrical stator core supported in said case so as to envelop said rotor, slots extending axially being formed in said stator core so as to line up in a circumferential direction at a ratio of two per phase per pole; and
      a stator winding constructed by installing a conductor wire coated with an electrical insulator in said stator core,
      a relationship between a radial dimension (d) of said conductor wire coated with said electrical insulator and a circumferential width dimension (L) of said slots being 2d<L,
      wherein a deformable plug is disposed inside an opening portion of said slots, and a cut portion is formed in said plug.

2. The automotive alternator according to claim 1 wherein a oross section of said slots taken along a radial direction has a rectangular shape.

3. The automotive alternator according to claim 1 wherein a width dimension (s) of an opening portion of said slots is 1.5 or more times a radial dimension (d) of said conductor wire.

4. The automotive alternator according to claim 1 wherein an inner circumferential corner portion of a radially-wide flange portion on a tip portion of a tooth between said slots has a curved shape.

5. The automotive alternator according to claim 4 wherein shapes of first and second circumferential end portions of said flange portion are asymmetrical.

6. The automotive alternator according to claim 1 wherein an electrically-insulating resin layer is formed on an inner wall surface of said slots.

7. The automotive alternator according to claim 1 wherein first and second three-phase alternating-current windings are constructed by installing a plurality of said conductor wires in said slots, a predetermined number of said conductor wires being bundled together.

8. The automotive alternator according to claim 1 wherein a deforming cylindrical plug is disposed inside an opening portion of said slots.

9. The automotive alternator according to claim 8 wherein a varnish portion is disposed on an inner circumferential side of said plug.

10. The automotive alternator according to claim 1 wherein a deforming hollow cylindrical plug is disposed inside an opening portion of said slots.

* * * * *